UNITED STATES PATENT OFFICE.

CURTIS C. MEIGS, OF CHARLESTON, SOUTH CAROLINA.

PROCESS OF PRODUCING NITRIC AND SULFURIC ACIDS.

1,120,960.  Specification of Letters Patent.  Patented Dec. 15, 1914.

No Drawing.   Application filed October 18, 1913. Serial No. 796,070.

*To all whom it may concern:*

Be it known that I, CURTIS C. MEIGS, a citizen of the United States, residing at Charleston, in the county of Charleston and State of South Carolina, have invented certain new and useful Improvements in Processes of Producing Nitric and Sulfuric Acids, of which the following is a specification.

My invention relates to an improved process of producing nitric acid, and sulfuric acid.

An important object of my invention is to provide a process of the above mentioned character, whereby the nitric acid and sulfuric acid will be produced, the production of one aiding in the production of the other, economizing in time, material and labor.

A further object of my invention is to provide a novel method of producing nitric acid from ammonia.

Broadly, my invention consists in burning sulfur to produce nitrogen and sulfur dioxid, combining the nitrogen with hydrogen to produce ammonia gas, treating the ammonia gas to produce dilute nitric acid, treating the sulfur dioxid to produce sulfuric anhydrid, introducing the sulfuric anhydrid into the dilute nitric acid to form concentrated nitric acid and dilute sulfuric acid, and separating the nitric and sulfuric acids.

In the practice of my process the gases used are nitrogen, hydrogen, oxygen, ozone, sulfur dioxid, and ammonia. The nitrogen and sulfur dioxid are produced by burning sulfur or sulfur bearing ores in such a manner that the resulting gas contains only nitrogen and sulfur dioxid. This is preferably accomplished by using a mechanical roasting furnace of suitable construction, and so regulating the draft that perfect combustion is obtained, resulting in a gaseous mixture of nitrogen and sulfur dioxid, the oxygen supplied to the sulfur during combustion being just sufficient to form sulfur dioxid and the metal oxids. The oxygen and hydrogen are preferably produced by the well known process of electrolysis of water.

In the practice of my process, the nitrogen produced by burning the sulfur (the sulfur dioxid formed at the same time being absorbed by suitable means), is subjected to the action of the electrical discharge in a chamber containing sufficient hydrogen, to form ammonia gas. This gas is preferably withdrawn and absorbed by sprays of cold water in another chamber, this cold water acting as a cooler for the gas and preventing, to some extent, the reversion of the ammonia gas into its constituent elements. The cold water with the ammonia dissolved therein, or the ammonia liquor thus obtained, is withdrawn from this chamber and passed through an apparatus where it is suitably heated, to drive off the ammonia gas. This ammonia gas is now passed through or into an ozonizer of any well known or preferred construction for producing chemical reactions by means of ozone, preferably of the type wherein the ozone is produced from oxygen in the presence of the material to be acted upon, whereby the ammonia gas is subjected to the action of ozone, the same combining therewith to form nitric acid and water. This nitric acid is dilute. The chemical reaction occurring when the ammonia is ozonized is believed to be represented by the following equation,

$$(NH_3 + O_3 + O = HNO_3 + H_2O).$$

The sulfuric anhydrid is obtained by ozonizing the sulfuric dioxid, which was separated from the nitrogen (the nitrogen and sulfur dioxid resulting from the combustion of the sulfur), as hereinabove stated. In ozonizing the sulfur dioxid it is subjected to the action of ozone in an ozonizer of any well known or preferred construction for producing chemical reactions by means of ozone preferably of the type wherein the ozone is produced from oxygen in the presence of the material to be acted upon. The sulfuric anhydrid is now added to the dilute nitric acid, for the sole purpose of absorbing the water in the weak nitric acid, and with this in view it is added only in such proportions as will entirely absorb all excess moisture or water from the nitric acid. This results in a mixture of concentrated or chemically pure nitric acid and dilute sulfuric acid. This mixture is now heated, vaporizing and driving off the nitric acid, which is condensed and collected in a highly concentrated state. The dilute sulfuric acid is concentrated by heating, as is well known. It may be used for the absorption of any excess sulfuric anhydrid that is not necessary for the drying of the weak nitric acid.

Having described my invention, I claim:—

The process of producing nitric and sulfuric acids which consists in burning sulfur to produce a mixture of sulfur dioxid and nitrogen, combining such nitrogen with hydrogen to produce ammonia, oxidizing the ammonia to produce dilute nitric acid, oxidizing the sulfur dioxid to produce sulfuric anhydrid, introducing the sulfuric anhydrid into the dilute nitric acid to produce concentrated nitric acid and dilute sulfuric acid and separating the nitric and sulfuric acids.

In testimony whereof I affix my signature in presence of two witnesses.

CURTIS C. MEIGS.

Witnesses:
J. L. HOYLE,
ROBERT G. BARR.